US008385554B2

(12) United States Patent
Granados et al.

(10) Patent No.: US 8,385,554 B2
(45) Date of Patent: *Feb. 26, 2013

(54) PREVENTING EXECUTION OF PIRATED SOFTWARE

(75) Inventors: Axel Aguado Granados, Rochester, MN (US); Benjamin A. Fox, Rochester, MN (US); Nathaniel J. Gibbs, Rochester, MN (US); Jamie R. Kuesel, Rochester, MN (US); Andrew B. Maki, Rochester, MN (US); Trevor J. Timpane, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1408 days.

This patent is subject to a terminal disclaimer.

(21) Appl. No.: 11/850,098

(22) Filed: Sep. 5, 2007

(65) Prior Publication Data

US 2009/0063868 A1 Mar. 5, 2009

(51) Int. Cl.
*H04L 29/06* (2006.01)
(52) U.S. Cl. ............................................. 380/278
(58) Field of Classification Search ............ 726/2, 3, 726/5, 10, 22, 24–26, 30, 32, 35; 713/150, 713/153, 165, 167, 170, 171, 187–189, 191; 380/1, 228, 239, 246, 255, 37, 43, 278, 286; 717/103, 106, 126, 127, 131, 171–174, 176–178; 382/232; 711/1, 100, 164, 200, 202; 715/220, 715/233, 234, 250, 255, 272, 740, 741, 749
See application file for complete search history.

(56) References Cited

U.S. PATENT DOCUMENTS

| | | | |
|---|---|---|---|
| 5,933,497 A | 8/1999 | Beetcher et al. | |
| 6,131,162 A * | 10/2000 | Yoshiura et al. | 713/176 |
| 7,188,186 B1 * | 3/2007 | Meyer et al. | 709/231 |
| 7,287,166 B1 * | 10/2007 | Chang et al. | 713/187 |
| 7,536,026 B2 * | 5/2009 | Kaneda et al. | 382/100 |
| 7,643,689 B2 * | 1/2010 | Yoshigahara et al. | 382/232 |
| 7,814,023 B1 * | 10/2010 | Rao et al. | 705/59 |
| 7,831,517 B1 * | 11/2010 | Vijay et al. | 705/59 |
| 7,877,613 B2 * | 1/2011 | Luo | 713/187 |
| 2003/0233547 A1 | 12/2003 | Gaston et al. | |

OTHER PUBLICATIONS

Smithers, Matthew B.—Office Action dated Sep. 16, 2010; U.S. Appl. No. 11/850,079.
Granados, USPTO Notice of Allowance, U.S. Appl. No. 11/850,079, filed Sep. 5, 2007.

* cited by examiner

*Primary Examiner* — Kim Vu
*Assistant Examiner* — Leynna Truvan
(74) *Attorney, Agent, or Firm* — Dillon & Yudell, LLP (57) ABSTRACT

A method, system and computer program product for preventing execution of pirated software. A file is loaded on an end user's computer containing a binary image that is generated by removing one or more code bits from an executable code. A request is sent to a remote server to return a software key required for execution of the executable code from the binary image. The software key is downloaded to the end user's computer on which the binary image is loaded. One or more bits from the software key is inserted into the appropriate location of the binary image to regenerate the executable code. The executable code is enabled for execution on the end user's computer only following the embedding of the one or more bits.

11 Claims, 8 Drawing Sheets

PREVENTING EXECUTION OF PIRATED SOFTWARE

RELATED APPLICATIONS

The present invention is related to the subject matter of the following co-pending, commonly assigned U.S. patent application Ser. No. 11/850,079, filed concurrently herewith. The subject matter of that related application is incorporated herein by reference.

BACKGROUND

1. Technical Field

The present invention generally relates to computer software and in particular to an improved method for protecting computer software.

2. Description of the Related Art

Within the last decade, the utilization of computers in homes and offices has become extensively widespread. However, the increasing use of computers has resulted in unauthorized use and copying of computer software, which unfortunately causes software developers to lose substantial revenue. Although unauthorized copying of computer software is a violation of the law, the widespread availability of pirated software and difficulties in enforcing against such piracy have resulted in increasing use of pirated software.

Software piracy is one of the most problematic issues facing software developers. Developers are hurt by loss in revenue, and consumers are hurt by the possibility of using software that is cracked, possibly causing a breach in the security of their computer system. Current solutions to software piracy involve use of serial numbers or the use of a verification code to validate software that has been legally purchased. However, serial numbers and verification codes may be easily cracked utilizing decompilers.

Dongles, or hardware keys, are an alternative method of security utilized to authenticate software. Software developers use dongles as a form of software copy prevention. Dongles are distributed with legally purchased software and allow computer systems to run the software when the hardware key is installed. Dongles may be expensive and generally inconvenient to the end user. A solution is needed that is transparent to the end user and easy to implement by software developers.

SUMMARY OF ILLUSTRATIVE EMBODIMENTS

Disclosed are a method, system and computer program product for partitioning the binary image of a software program, and partially removing code to create a software key, to increase software security. The software code binary image is analyzed to determine the location of splits and code removal to the software security key. The binary image is partitioned randomly or along a byte and/or nibble basis then removed and stored as part of a software security key. In addition to the removed bits, bytes and/or nibbles of software code, the software security key includes the positional location of the removed bits. The developer encrypts the software security key via any appropriate encryption algorithm and then separately distributes the fractioned binary image and the encrypted key to the end users. The encrypted key is stored on a secure remote server until the end user requests the removed bits of code for execution of the software. When the encrypted key is requested and the developer determines and verifies the authenticity of the user, the key is downloaded to the user's computer. The end user's computer then locally decrypts the key, and the bits of code are ready to be inserted into the binary image utilizing the positional location. The fractioned code is then "stitched" with the code in the software security key recreating the original binary image to complete execution of the software program.

In one embodiment, the invention provides a method, system and computer program product for preventing execution of pirated software. A file is loaded on an end user's computer containing a binary image that is generated by removing one or more code bits from an executable code. A request is sent to a remote server to return a software key required for execution of the executable code from the binary image. The software key is downloaded to the end user's computer on which the binary image is loaded. One or more bits from the software key is inserted into the appropriate location of the binary image to regenerate the executable code. The executable code is enabled for execution on the end user's computer only following the embedding of the one or more bits.

In another embodiment, the invention provides a method that mitigates performance degradation when the encrypted key data is stitched back into the binary image. Accurately stitching bits of code from the encrypted key into the binary image requires reinserting the bits of code into the original position within the image. To facilitate optimal stitching performance later, when the bit sequences are removed from the binary image, the missing bits are replaced with random placeholder bits. During execution of the software program, the operative code is efficiently reinserted into the binary image in place of the random placeholder bits, utilizing the positional location information stored in the software key.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for partitioning the binary image of a software program, and partially removing code to create a software key, to increase software security. The software code binary image is analyzed to determine the location of splits and code removal to the software security key. The binary image is partitioned randomly or along a byte and/or nibble basis then removed and stored as part of a software security key. In addition to the removed bits, bytes and/or nibbles of software code, the software security key includes the positional location of the removed bits. The developer encrypts the software security key via any appropriate encryption algorithm and then separately distributes the fractioned binary image and the encrypted key to the end users. The encrypted key is stored on a secure remote server until the end user requests the removed bits of code for execution of the software. When the encrypted key is requested and the developer determines and verifies the authenticity of the user, the key is downloaded to the user's computer. The end user's computer then locally decrypts the key, and the bits of code are ready to be inserted into the binary image utilizing the positional location. The fractioned code is then "stitched" with the code in the software security key recreating the original binary image to complete execution of the software program.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
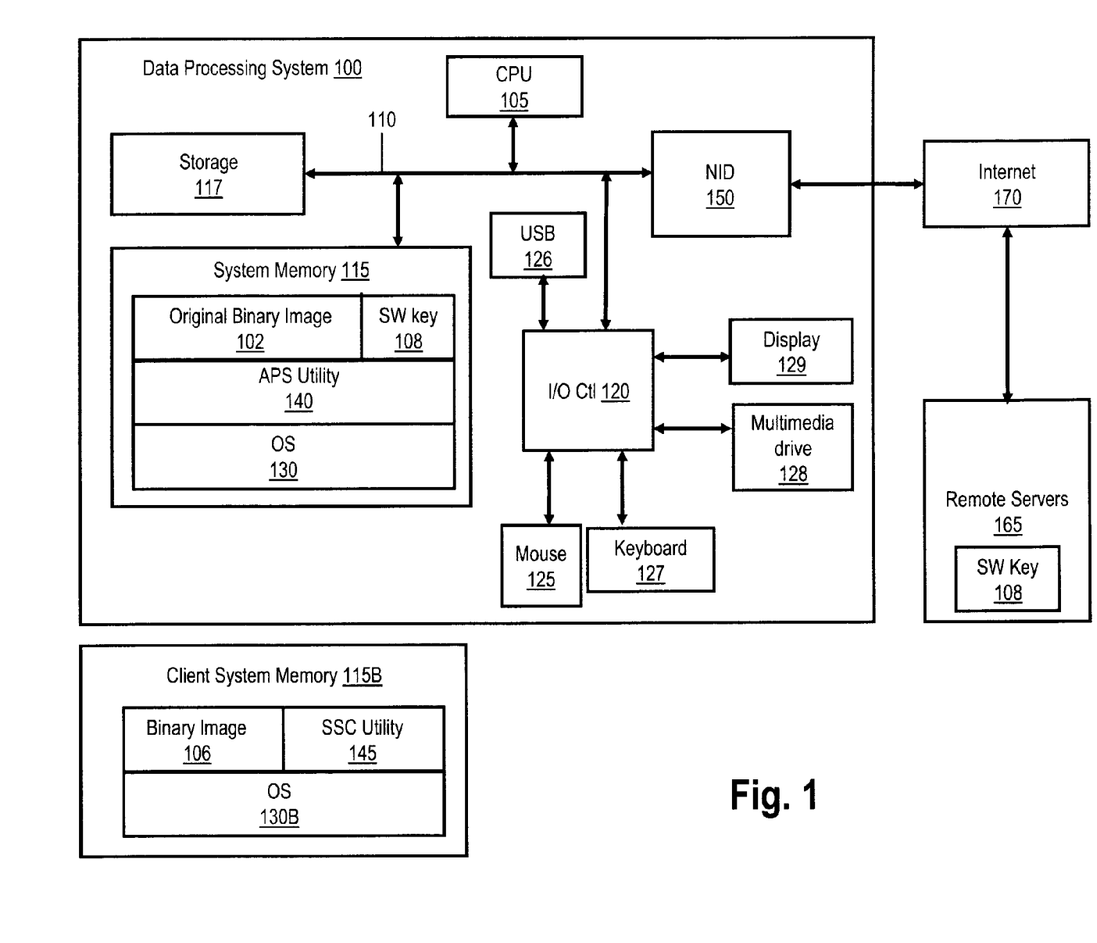
FIG. 1 is a diagram of an example data processing system according to one embodiment of the invention.

With reference now to the figures, FIG. 1 depicts a block diagram representation of a data processing system (and connected network) utilized by the software developer. Data processing system 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) hub 126 are illustrated, coupled to I/O controller 120. Multimedia drive 128 and USB hub 126 may operate as both input and output (storage) mechanisms. DPS 100 also comprises storage 117, within which data/instructions/code may be stored.

DPS 100 is also illustrated with a network interface device (NID) 150, with which DPS 100 connects to one or more servers 165 via an access network, such as the Internet 170. In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, or GNU®/Linux®, registered trademarks of the Free Software Foundation and The Linux Mark Institute), applications 135, and anti-pirating software (APS) utility 140. For simplicity, APS utility 140 is illustrated and described as a stand alone or separate software/firmware component, which provides specific functions, as described below.

CPU 105 executes APS utility 140 as well as OS 130, which supports the software developer interface features of APS utility 140. Among the software instructions provided by APS utility 140, and which are specific to the invention, are: (a) code for partitioning software program code into an inoperable binary image and a software key to increase security of the software program; (b) code for generating and storing the software key on a secure remote server, accessible when the binary image of the program requires the software key for execution of the software program; and (c) code for authenticating an end-user and an end-user computer system prior to providing the software key, among other coded functionality.

For simplicity of the description, the collective body of code that enables these various features is referred to herein as APS utility 140. According to the illustrative embodiment, when CPU 105 executes APS utility 140, DPS 100 initiates a series of functional processes that enable the above functional features as well as additional features/functionality, which are described below within the description of FIGS. 2-7.

Imbedded in the developed software program provided to the end-user by the software developer is a stitching and splitting code (SSC) utility. Among the software instructions provided by the SSC utility, and which are specific to client device-implemented features of the invention, are: (a) code for requesting the software key from the server; (b) code for decrypting the software key for utilization; (c) code for positioning and stitching appropriate software key bits into the binary image to enable execution of the software program. Insert of FIG. 1 represents an example client system memory 115B within which are executable software components (and inoperable binary image). As shown, client system memory 115B comprises OS 130B, binary image 106, and SSC utility 145. Client system memory 115B replaces system memory 115 when DPS 100 is a client device on which the stitched program code is executed. With this implementation, SSC utility 145 executing on CPU 105 accesses remote server 165 to retrieve SW key 108, when the program is to be executed on client DPS (100).

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
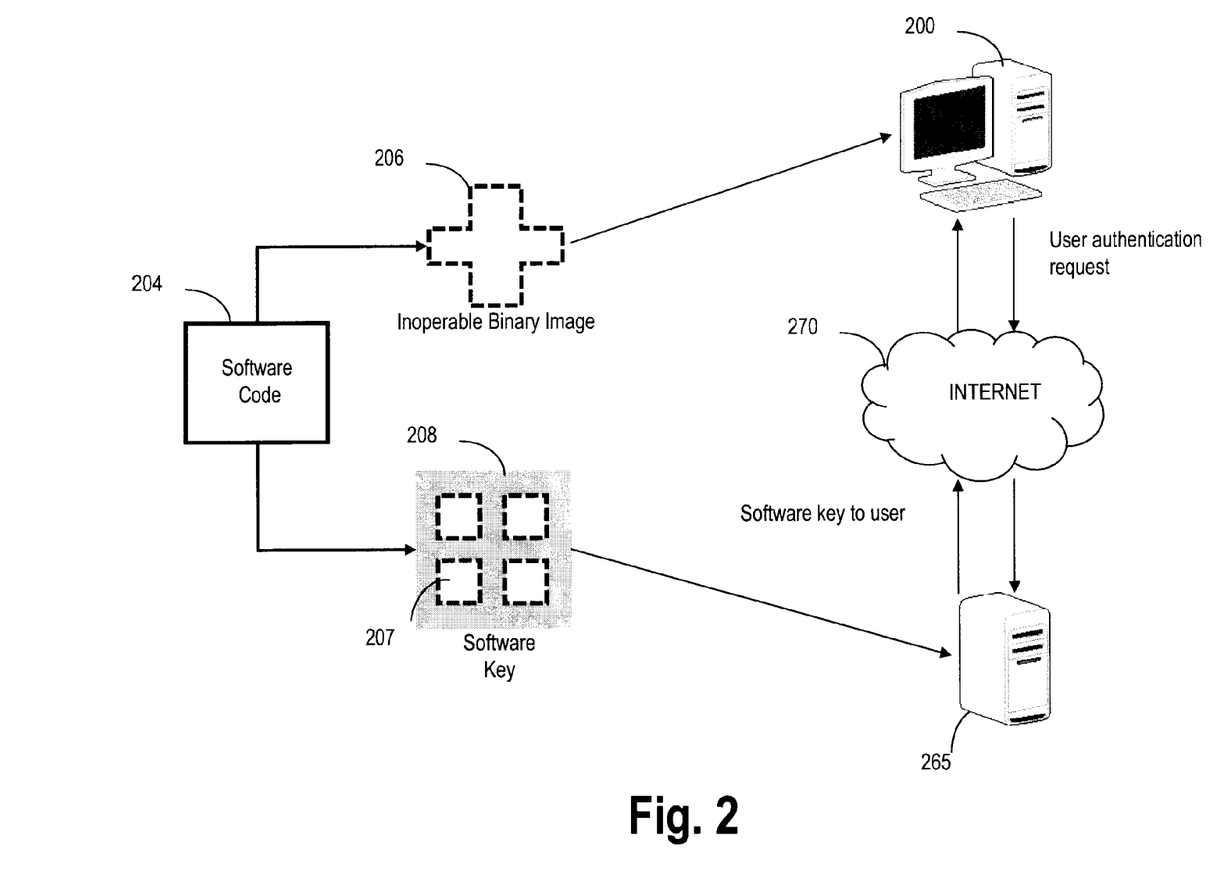
FIG. 2 is a diagram of a networked computer that utilizes the remotely stored software key in accordance with one embodiment of the invention.

With reference now to FIG. 2 which illustrates the partitioning of software code into binary image and a software key. The schematic of FIG. 2 comprises software code 204 divided into binary image 206 and software key 208. Client computer 200, communicates with developer server 265 via Internet 270. Binary image 206 is installed in client computer 200, while software key 208 is remotely stored on developer server 265.

To increase security and decrease susceptibility to pirating, a part of software code 204 is fractioned and removed to a remote location. Following development and prior to retail, program (or software) code 204 is analyzed to locate the most efficient splitting positions. In one embodiment, the code is split along a byte or nibble into binary image 206 and software key 207. Software key 208 is composed of code bits 207 removed from program code 204, as well as information of the positional location of code bits 207 within binary image 206. Code bits 207 and positional information are encrypted within software key 208. Client computer 200, similar to data processing system 100, comprises an operating system conducive to installing new software. When purchased, binary image 206 is installed in client computer 200. Binary image 206 may be downloaded from a website (e.g. the website of the software developer), or installed via a hardware medium (e.g. CD, DVD, flash memory card, USB drive, etc.).

In one embodiment, client computer 200 executes binary image 206. Binary image 206 is inoperative without software key 208. Software key 208 is remotely stored on developer server 265 and may be accessed via Internet 270. Client computer 200 must be authenticated by developer server 265 in order to download software key 208. Identification of client computer 200 may be performed via automatically uploading a single computer identification code for each software program or license purchased. A username and password may be utilized in conjunction with computer identification. The first uploaded computer identification is the only computer identification code that will release the software key from the remote server. When client computer 200 request software key 208, and client computer 200 is positively identified, software key 208 is downloaded and decrypted.

Software stitching occurs between code bits 207 and binary image 206, according to the positional location information stored in software key 208. Software stitching reinserts code bits 207 into binary image 206. Once code bits 207 have been stitched to binary image 206, client computer 200 may fully execute software code 204.

Figure 3:
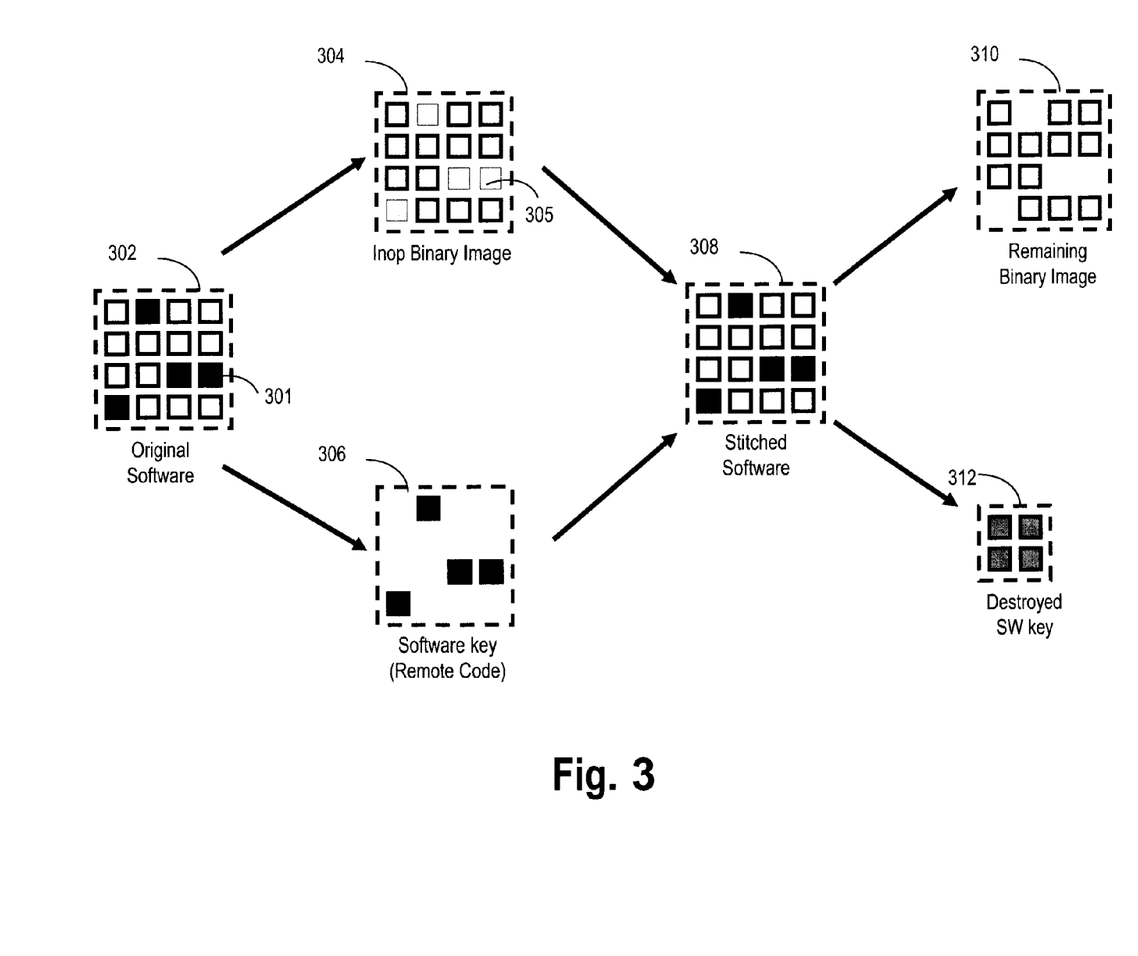
FIG. 3 is a schematic diagram illustrating a system of splitting and stitching software code in accordance with one embodiment of the invention.

FIG. 3 illustrates developer level splitting and user level stitching of software code. In the schematic of FIG. 3, original software code 302 is split into binary image 304 and software key 306, as similarly shown in FIG. 2. Code bits 301 (represented by filled-in squares) are removed to create software key 306, while temporary (or junk) bits 305 (represented by shaded squares) are random bits of code utilized to temporarily fill the void of code bits 301. Stitched software 308 exchanges the temporary (junk) bits 305 for the original code bits 301 to enable execution of original software code 302. When the software program is closed, the program's software code is again fragmented and the downloaded software key is destroyed. Stitched software 308 is fractioned into resulting binary image 310 with destroyed code bits 312. The resulting binary image is thus inoperable until a later download of the code bits 301.

In one embodiment the invention optimizes performance and security of the software during software splitting. Software splitting is accomplished through an automated process, invisible to the coder. Original software code 302 is analyzed by APS utility to determine possible locations of splits to binary image 304. To increase efficiency of the stitching process, thereby maintaining performance of original software code 302, the location of the splits in original software code 302 follow a byte or nibble alignment. In another embodiment, however, random bytes or nibble multiples are removed from original source code 302.

In one embodiment of the invention, code bits 301 are stored in software key 306 on a remote server (the developer's server). Software key 306 also maintains the positional location of bits of code 301. All information stored on software key 306 is encrypted, and only released to clients who have been identified as purchasers of original code 302. Binary image 304 is installed on a client computer as shown in FIG. 2. Binary image 304 requires software key 306 to complete execution. When requested by binary image 304, during software execution, software key 306 is retrieved and decrypted, and code bits 301 are used to replace junk code 305. Upon the reinsertion of code bits 301 into binary image 304, stitched software 308 becomes fully operative on the client computer.

In one embodiment of the invention, when the client has finished utilizing the software program, bits of code 301 are removed from stitched software 308. Binary image 304 remains installed on the client's computer as remaining binary image 310, while bits of code 301 are uninstalled and become destroyed code bits 312. Each time binary image 304 is executed, software key 306 is downloaded, decrypted, and utilized to complete execution of the software program.

In one embodiment, the invention provides a way to download software key 306 once, and store the encrypted software key on the client computer. Each time binary image 304 requires software key 306, SSC utility searches the local hard drive, or a local server to locate software key 304. While software key 306 is locally stored, code bits 301 and positional location may not be stored on system memory, such as system memory 115 as shown in FIG. 1. Software key 306 may be stored on secure memory and remains encrypted.

In one embodiment, bits of code 301 and positional location are accessible to system memory in intervals, as software execution dictates need of the missing bits of code. SSC utility stitches and unstitches binary image 304 and code bits 301 in real time, as required by the software program. Utilizing a real-time stitching and unstitching method of software execution significantly decreases exposure of the full software code to computer memory or any software code imaging device.

In one embodiment of the invention, a hardware component installed on the client computer completes the stitching of code bits 301 and binary image 304. The hardware component comprises a software utility added to client computer 200 that assists in stitching bits of code 301 and binary image 304. Software key 306 is downloaded and decrypted if the hardware component is present. Stitching software on the hardware component releases code bits 301, inserts code bits 301 into binary image 304, and completes the stitching process. Only data processing units with the hardware component installed for stitching the software (provided with the original software), are capable of completely executing original software 302 in this embodiment.

Figure 4:
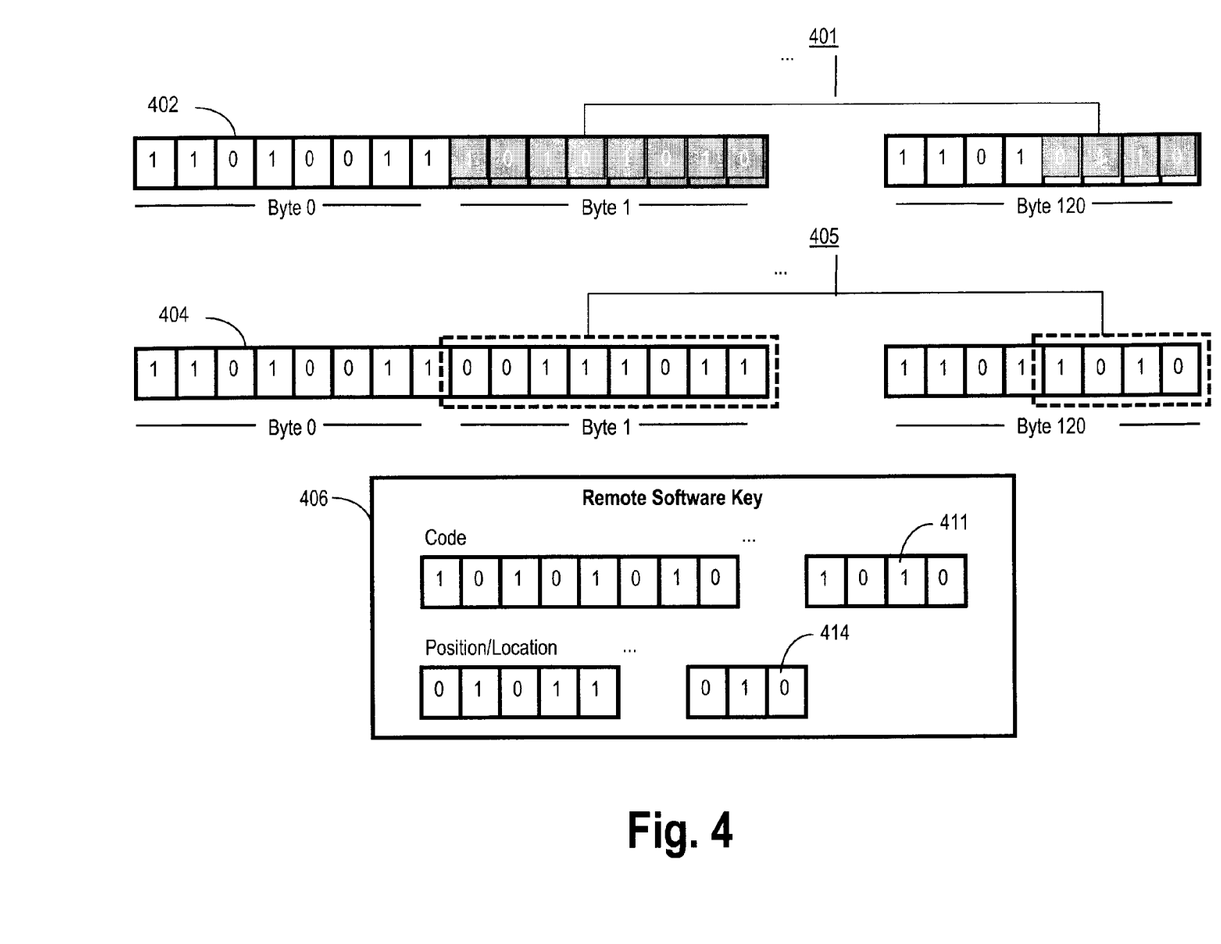
FIG. 4 is a schematic diagram illustrating a method for splitting software code into random four bit multiples for removing to a software key according to one embodiment of the invention.

FIG. 4 illustrates the implementation of splitting software code for code bits that are stored in the software key. FIG. 4 comprises original code 402, including code bits 401, which represent the software code during analysis, prior to splitting. Binary image 404 and temporary/junk code 405 is inoperative software code that is installed in a client computer. Remote software key 406 is stored on a remote server, such as developer server 265. Stored within software key 406 are remotely stored code 411 and positional location 414. Positional location 414 is code that identifies the location of remotely stored code 411 in binary image 404.

In one embodiment of the invention, original code 402 is composed of one hundred twenty bytes, containing eight bits per byte. Code bits 401 are removed in four bit multiples to store in remote software key 406. When code bits 401 are removed from original code 402, the code becomes inoperative. Binary image 404 illustrates the inoperative code. Code bits 401 are replaced by junk code 405, which are random bits of code utilized to fill the void of remotely stored bits 411. Replacing code bits 401 with junk code 405 allows binary image 404 to remain byte aligned and comprise the same file size as original code 402. Maintaining byte alignment increases the efficiency of software stitching and decreases data shifting in the cache or memory when software stitching is required.

In one embodiment, the invention is implemented without replacing code bits 401 with junk code 405. In this embodiment, positional location information within software key 406 is utilized to insert remotely stored bits 411 into binary image 404.

Figure 5A:
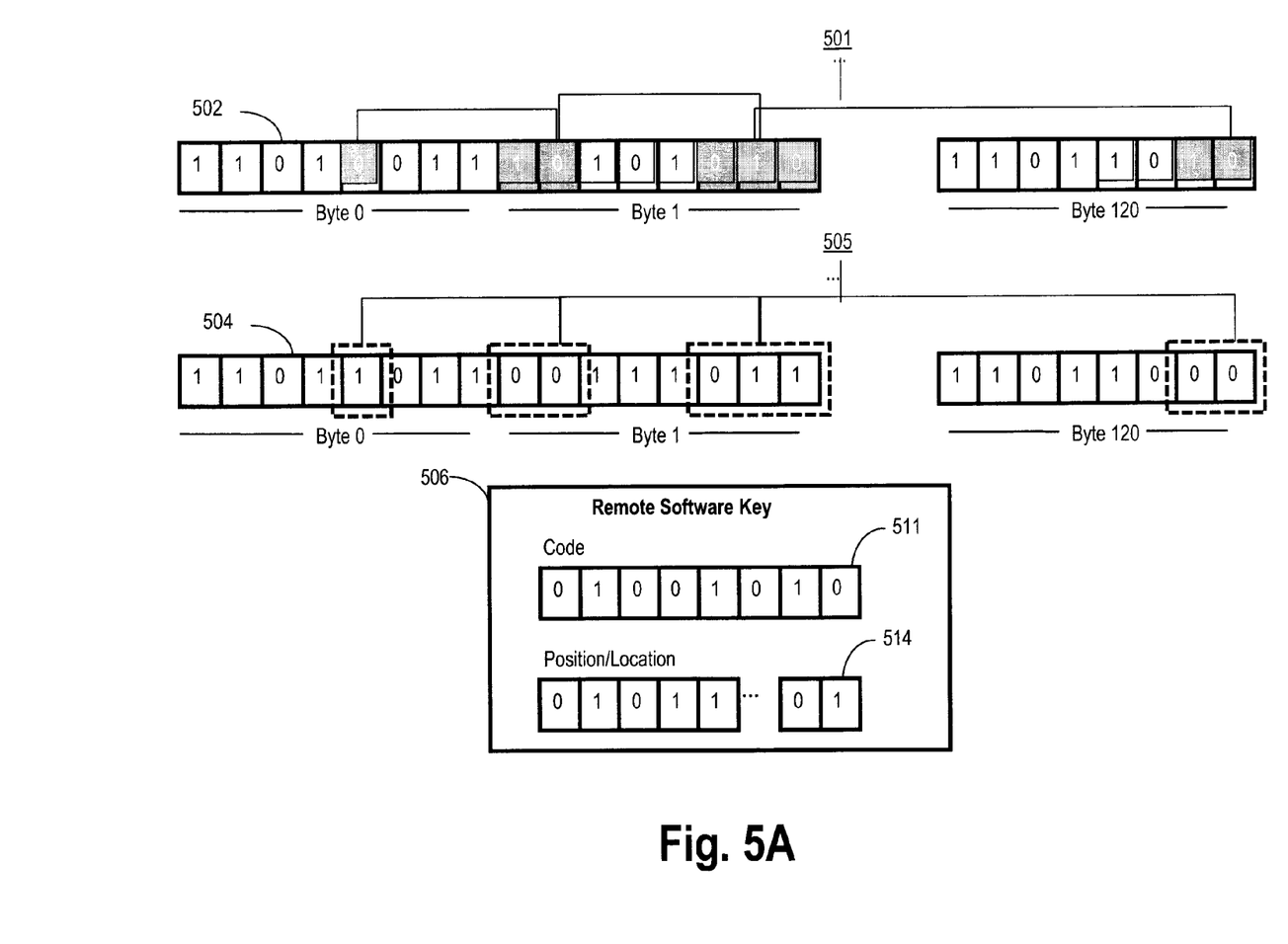
FIGS. 5A and 5B are schematic diagrams illustrating two alternate methods for splitting software code into random bits for removing to a software key according to embodiments of the invention.

Illustrated in FIG. 5A is an embodiment of the invention that randomly splits the software code. FIG. 5 comprises original code 502 and random code bits 501 that are selected during analysis, prior to splitting, to be removed from the original software code. Binary image 504 together with junk code 505 provides inoperative software code, which is installed in the client computer. Remote software key 506 is stored on a remote server. Stored within software key 506 are remotely stored bits 511 and positional location 514. Positional location 514 is a set of bits that identifies the location of remotely stored code 511 in binary image 504.

In one embodiment, the invention provides a system of software splitting that randomly selects bits of code to remove from original software code 502. Random code bits 501 are removed from original code 502 and stored in remote software key 506. Binary image 504 remains after random code bits 501 are removed; therefore junk code 505 is utilized to replace random code bits 501. Without random code bits 501, binary image 504 cannot be fully executed. Remote software key 506 stores and encrypts remotely stored code 511 and positional location 514.

Figure 5B:
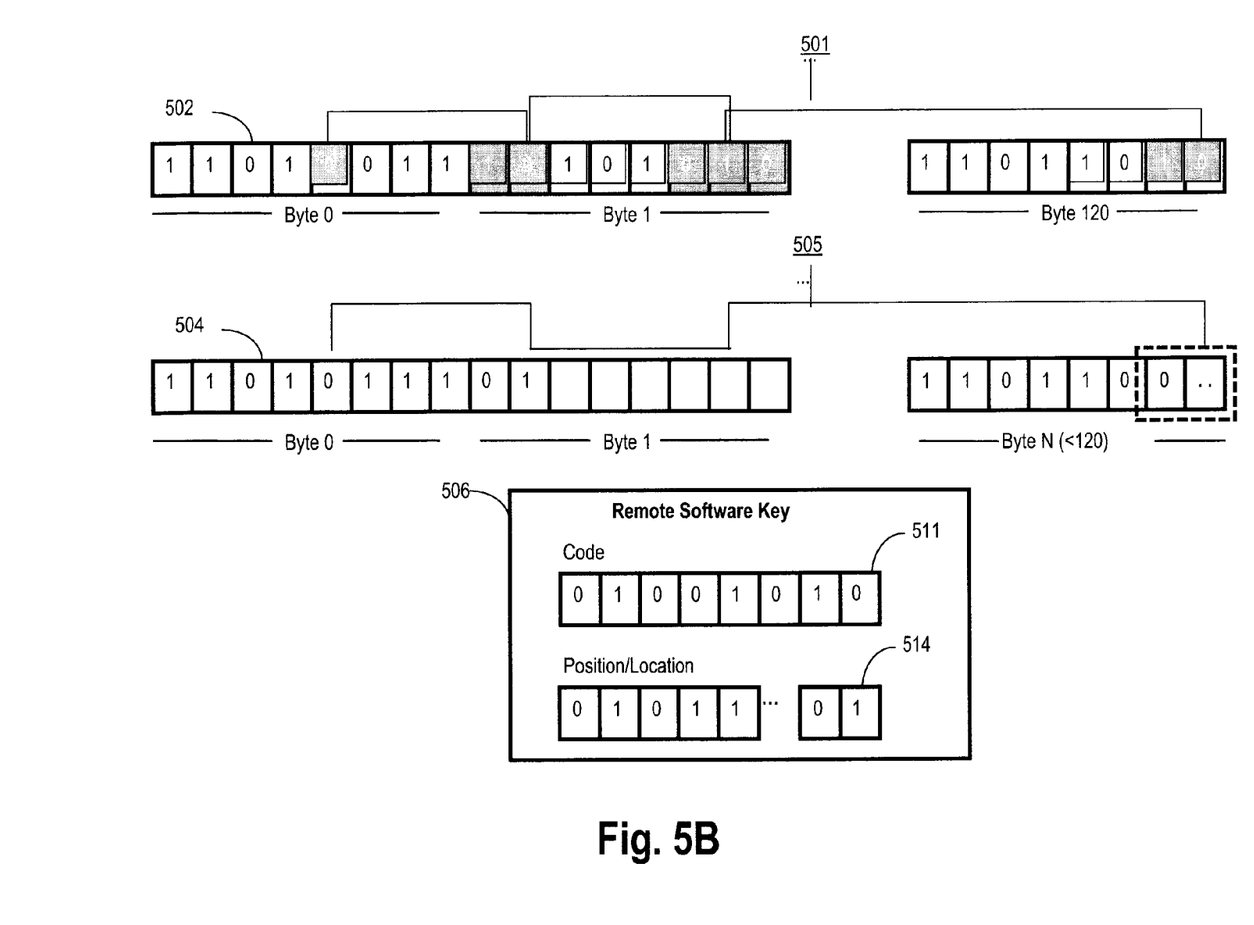

FIG. 5B illustrates an alternative embodiment to that of FIG. 5A in which concatenation of the binary image occurs following removal of the code bits. That is, unlike the implementation illustrated by FIG. 5A, no junk code is inserted into the spaces remaining when the code bits are removed from the software code to create the software key. As illustrated, with the code bits removed, the 120 bytes of data is reduced to N bytes of data, where N is a number less than 120. According to the illustrative embodiment, re-inserting the number of code bits that make up the software key along with the N bytes of the binary image regenerates the original 120 bytes of data (program code).

Figure 6:
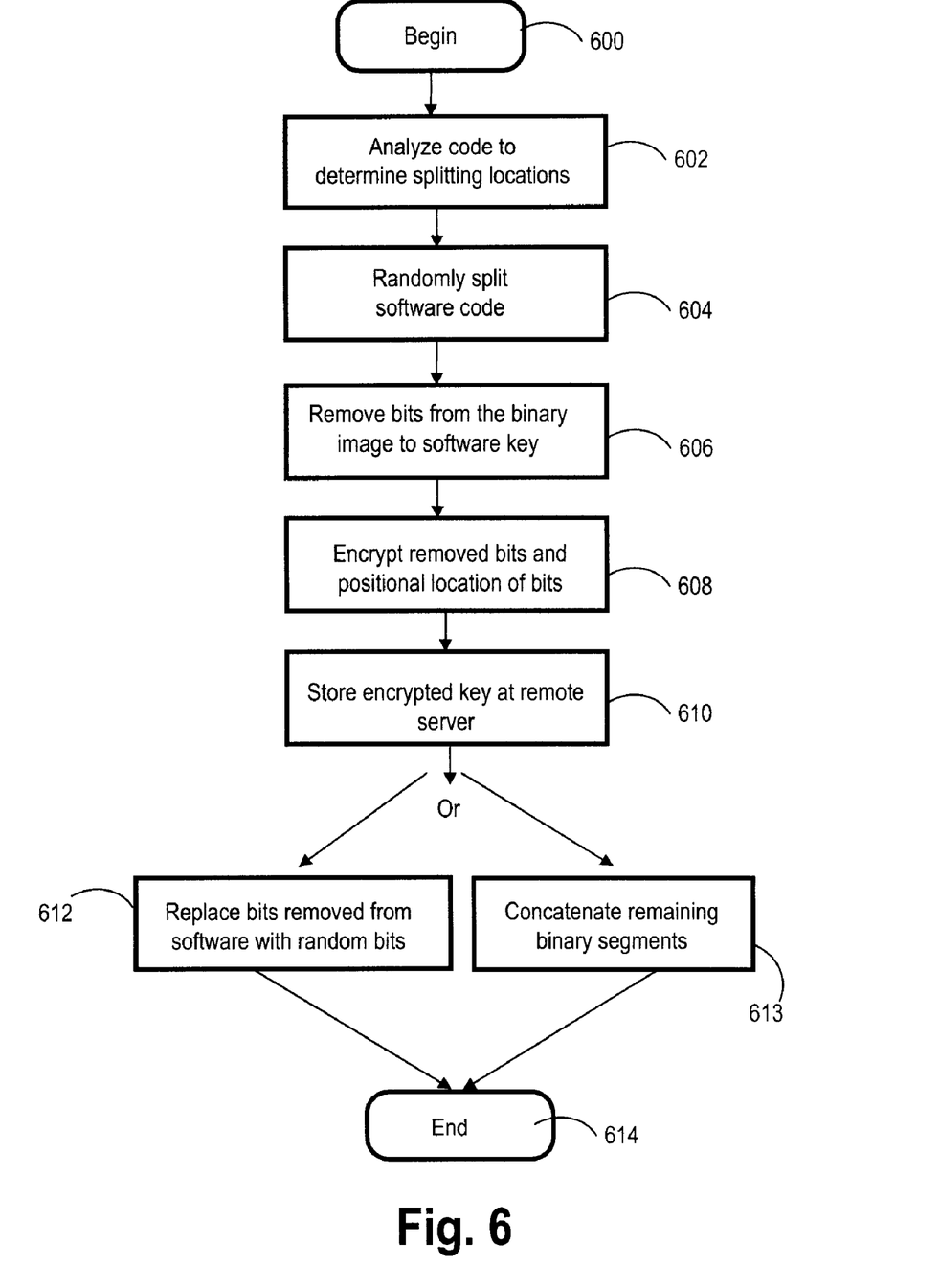
FIG. 6 is a logic flow chart illustrating the process of splitting software code and removing fractioned code to a software key according to one embodiment of the invention.
Figure 7:
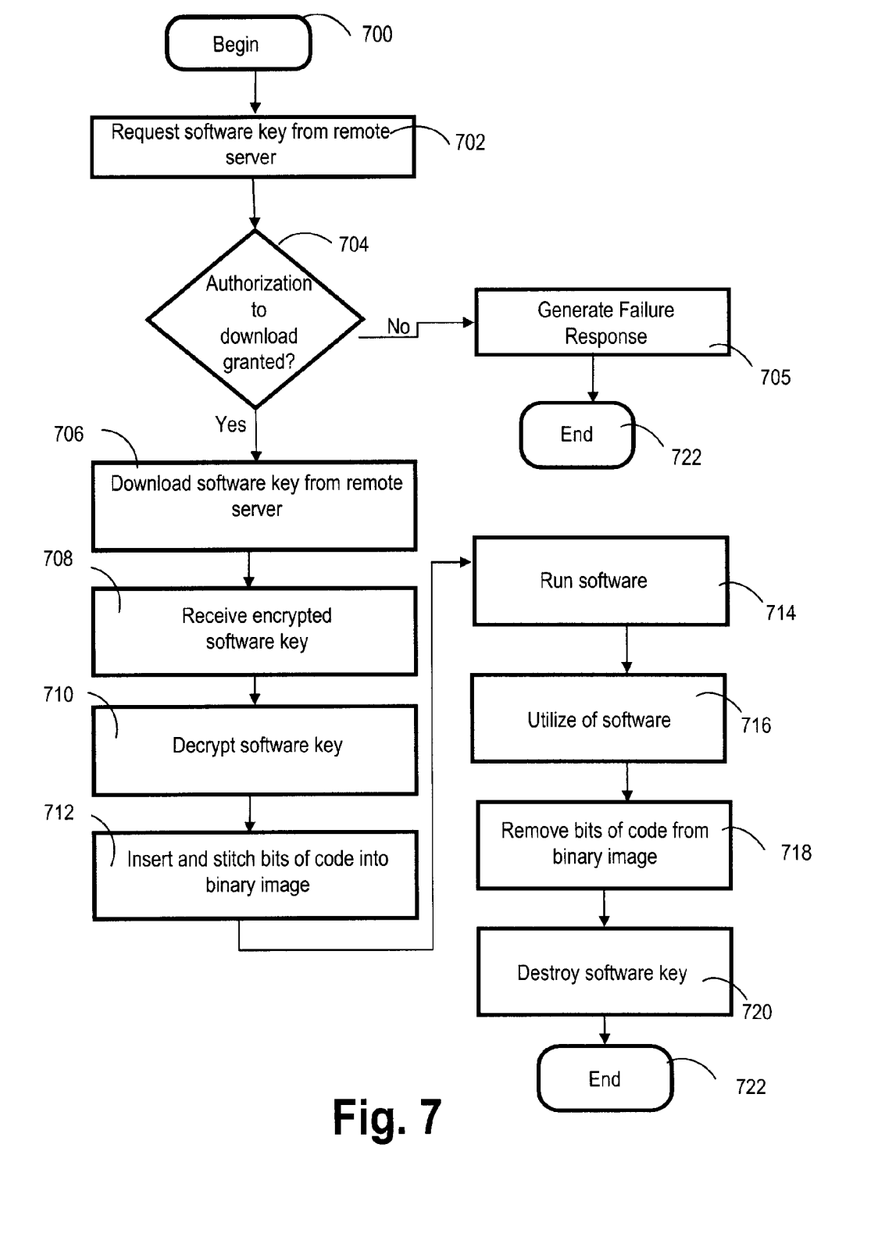
FIG. 7 is a logic flow chart illustrating the process of requesting a software key and stitching the fractioned code to the binary image according to one embodiment of the invention.

FIGS. 6-7 are flow charts illustrating various methods by which the above processes of the illustrative embodiments are completed. Although the methods illustrated in FIGS. 6-7 may be described with reference to components shown in FIGS. 1-5, it should be understood that this is merely for convenience and alternative components and/or configurations thereof can be employed when implementing the various methods. Several portions of the methods may be completed by APS utility 140 executing within DPS 100 (FIG. 1) and controlling specific operations on DPS 100, and the methods are thus described from the perspective of APS utility 140. Methods occurring at the client device may also be described as being completed by SSC utility imbedded in the end-user software utility, in one embodiment.

The process of FIG. 6 begins at initiator block 600 and proceeds to block 602, at which original software code is analyzed to determine the locations of the splits (which may be randomly assigned, in alternate embodiments). Splitting is automated and performed during development, prior to purchase of the software. At step 604, the original software code is randomly split into the binary image and code bits of the software key. The code bits are removed to create a software key, at step 606.

The software key comprises the bits of code required for complete execution of the software program, and the positional location of the bits in the binary image. At step 608, the software key is encrypted to safeguard the code bits from pirating. During development of the software program, code for communicating with the remote server is programmed/embedded into the binary image. The encrypted software key is stored at the remote server, at step 610, until requested by the binary image. One of two alternate implementations are then provided. In the first implementation, shown at step 612, the code bits removed from the original software code are replaced with random code bits in the binary image. With the second, alternate implementation, the remaining bits within the binary image are concatenated, to yield a compressed binary image (without additional bits inserted), as shown at step 613. The process ends at step 614. The binary image is later purchased and installed on a client computer.

The process of FIG. 7 begins at step 700, where the inoperative binary image is installed and initiated. The software key is requested from the remote server at step 702, following proper authentication of the client device and/or binary image. The request includes authentication parameters of the binary image and computer on which the program software is being executed. A decision is made at step 704 whether authorization to download the software key has been granted. When authorization is granted (i.e., the download is permitted), the software key is downloaded at step 706. If authorization is not received, the request for the software key from the remote server receives a failed response (perhaps after several attempts have been made to obtain authorization to download the software key), as shown at block 705.

At step 708, the encrypted software key is received. Prior to utilizing the software key, the code bits and positional location within the software key must be decrypted. Decryption of the software key is completed at step 710. At step 712, the decrypted bits of code are inserted and stitched into the binary image. When the bits of code have been re-inserted into the binary image, the software is operative and is executed at step 714. A check is made at step 716, whether the utilization of the software is completed. When the utilization is complete, the inserted bits of code are removed from the binary image at step 718. The bits of code removed from the binary image are destroyed at step 720 to avoid pirating of the software program. The process ends at step 722.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
   loading a file containing a binary image generated by removing one or more code bits from an executable code, wherein the binary image of the file is inoperable and cannot be executed on an end user's computer while the one or more code bits are missing;
   requesting, from a remote server, a software key required for execution of the executable code from the binary image;
   downloading the software key to the end user's computer on which the binary image is loaded;
   inserting the one or more bits from the software key into one or more appropriate locations of the binary image to regenerate the executable code; and
   enabling execution of the executable code on the end user's computer following the inserting of the one or more bits into the binary image to regenerate the executable code.

2. The method of claim 1, wherein said downloading further comprises:
   generating a request for retrieval of the software key;
   forwarding the request to an address of a server identified by code from a file associated with the binary image;
   receiving an encrypted version of the software key;
   locally decrypting the encrypted version of the software key utilizing decryption information contained within the file; and
   retrieving the one or more bits from the software key and inserting the one or more bits into the binary image according to positional information of the one or more bits from an original configuration of the executable code, which positional information is retrieved from within the file.

3. The method of claim 1, said inserting further comprising:
   stitching the binary image and the one or more bits from the software in real time, in response to an executing portion of the executable code requiring a complete sequence of code bits, including the one or more bits within the software key, for proper execution; and
   subsequently unstitching the one or more bits from the binary image in response to the one or more bits no longer being required for proper execution.

4. The method of claim 1 further comprising:
   restoring the binary image to an un-executable state after the executable code has completed execution; and
   destroying the software key.

5. A computer device having a processor, memory coupled to the processor, and a utility executing on the processor for providing the functions of claim 1.

6. A computer program product comprising:
   a non-transitory computer readable storage medium; and
   program code on the computer readable storage medium that when executed by a processor provides the functions of:
     loading a file containing a binary image generated by removing one or more code bits from an executable code, wherein the binary image of the file is inoperable and cannot be executed on an end user's computer while the one or more code bits are missing;
     requesting, from a remote server, a software key required for installation and execution of the executable code from the binary image;
     downloading the software key to the end user's computer on which the binary image is loaded;
     inserting the one or more bits from the software key into one or more appropriate locations of the binary image to regenerate the executable code; and enabling execution of the executable code on the end user's computer following the inserting of the one or more bits into the binary image to regenerate the executable code.

7. The computer program product of claim 6, wherein said code for downloading further comprises code for:
generating a request for retrieval of the software key;
forwarding the request to an address of a server identified by code from a file associated with the binary image;
receiving an encrypted version of the software key;
locally decrypting the encrypted version of the software key utilizing decryption information contained within the file; and
retrieving the one or more bits from the software key and inserting the one or more bits into the binary image according to positional information of the one or more bits from an original configuration of the executable code, which positional information is retrieved from within the file.

8. The computer program product of claim 6, said code for inserting further comprising code for:
stitching the binary image and the one or more bits from the software in real time, in response to an executing portion of the executable code requiring a complete sequence of code bits, including the one or more bits within the software key, for proper execution; and
subsequently unstitching the one or more bits from the binary image in response to the one or more bits no longer being required for proper execution.

9. The computer program product of claim 6, further comprising code for:
restoring the binary image to an un-executable state after the executable code has completed execution; and
destroying the software key.

10. A computer device having a processor, memory coupled to the processor, and a utility executing on the processor for providing the functions of claim 6.

11. A computer device having a processor, memory coupled to the processor, and a utility executing on the processor for providing the functions of claim 8.

* * * * *